Nov. 5, 1929.  M. G. HANSON  1,734,903
METHOD OF FORMING WINDOW REGULATOR GEAR MEMBER AND APPARATUS THEREFOR
Filed Nov. 23, 1925
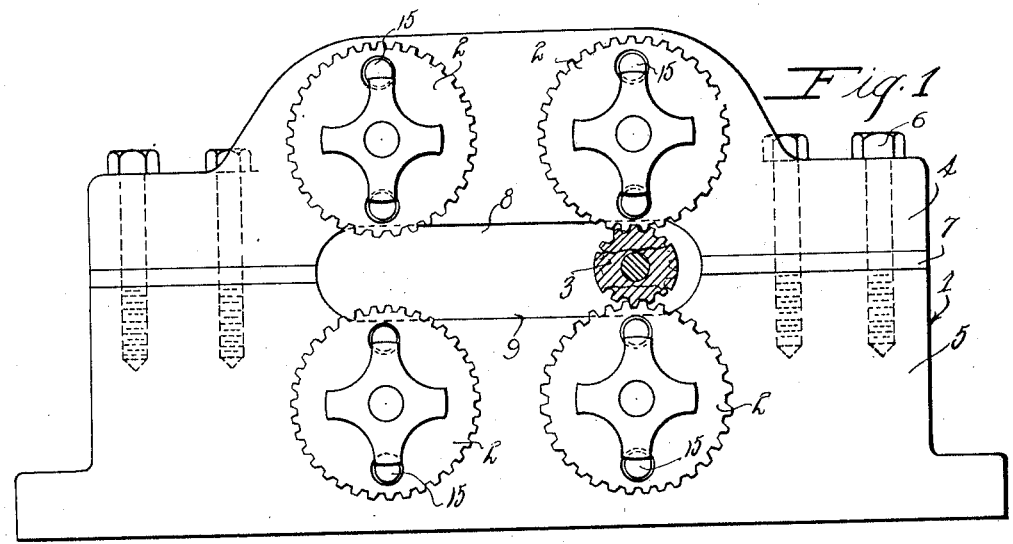
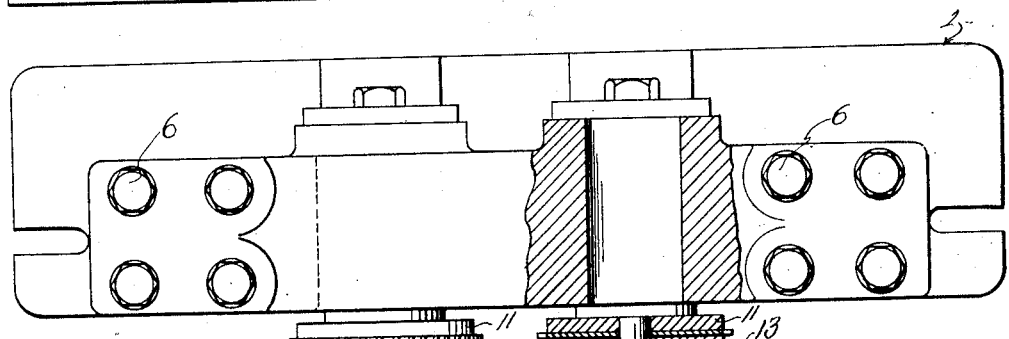
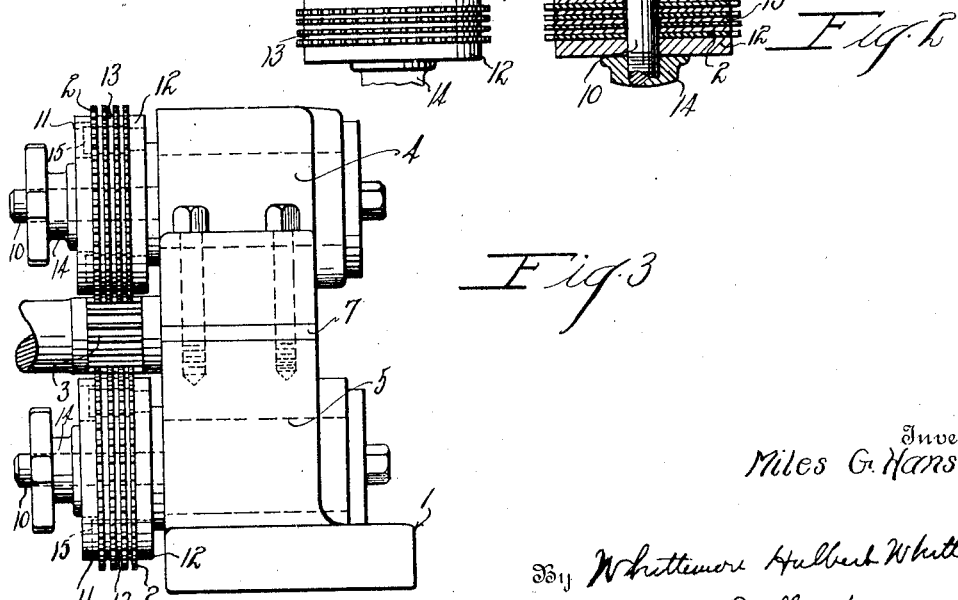
Inventor
Miles G. Hanson
By Whittemore Hulbert Whittemore
Belknap   Attorneys Patented Nov. 5, 1929

1,734,903

UNITED STATES PATENT OFFICE

MILES G. HANSON, OF TOLEDO, OHIO, ASSIGNOR, BY MESNE ASSIGNMENTS, TO THE DURA COMPANY, OF TOLEDO, OHIO, A CORPORATION OF OHIO

METHOD OF FORMING WINDOW-REGULATOR GEAR MEMBERS AND APPARATUS THEREFOR

Application filed November 23, 1925. Serial No. 70,877.

The invention relates to the manufacture of gear members and refers more particularly to the manufacture of gear members for use in window regulators. One of the objects of the invention is to provide an apparatus for rolling teeth upon a blank, which apparatus is so constructed that the tooth former which is engageable with the periphery of the blank has imposed upon its periphery a force acting in a direction opposite and substantially equal to that exerted by the blank, thereby avoiding liability of movement of the tooth former away from the blank during the rolling operation. Another object is the provision of a simple clamping device for securing a plurality of blanks in place so that their teeth may be simultaneously rolled. With these as well as other objects in view the invention resides in the novel features of construction and combinations and arrangements of parts as more fully hereinafter set forth.

In the drawings:

Figure 1 is a side elevation showing the portion of a machine embodying my invention;

Figure 2 is a sectional plan view thereof;

Figure 3 is an end view thereof.

1 is a support for the gear blanks 2 which are preferably formed of sheet metal and have oversized roughed out peripheral teeth and 3 is the tooth-forming die engageable with the roughed out teeth of the blanks to roll the same to final form. The support 1 is in the nature of a fixture secured upon a horizontally reciprocable table and the tooth-forming die is in the nature of a master gear fixed upon a rotating spindle, the table and spindle forming part of a machine such as a milling machine.

To avoid liability of movement of the tooth-forming die away from the blank with which it comes into engagement I have arranged the support 1 to carry vertically aligned blanks which are simultaneously engageable with opposite sides of the periphery of the tooth-forming die to exert substantially equal forces acting in opposite directions. Furthermore, the blanks are rigidly held on fixed axes at equal distances from the axis of the tooth-forming die so that corresponding teeth are rolled upon these blanks.

For the purpose of increasing production there are mounted upon the support 1 two pairs of vertically aligned blanks which are alternately engageable by the tooth-forming die, the arrangement being such that while the tooth-forming die is engaging one pair of blanks the other pair may be removed and replaced by unfinished blanks. To assure rolling the teeth of the blanks to the same depth in each instance, the pairs of vertically aligned blanks are so located that their vertical centers pass the vertical plane of the axis of the tooth-forming die during the reciprocation of the support 1 with the table to which it is secured.

To provide for wear of the tooth former the support 1 is made of upper and lower sections 4 and 5, respectively, which are rigidly secured to each other by suitable means such as the cap bolts 6 and have extending therebetween the shim or spacer 7 which may be removed and replaced by another of the proper thickness when required. These sections are preferably provided with complementary recesses 8 and 9, respectively, which form an elongated opening through which extends the spindle carrying the tooth-forming die.

In order to complete the rolling of the teeth of a number of blanks with the same rolling operation, I have provided clamping devices, each capable of securing a plurality of blanks in place at the same time. Each of these clamping devices has the arbor 10 mounted upon the support 1 and extending transversely therefrom, the cooperating inner and outer clamping members 11 and 12 respectively, which are rotatably mounted upon the arbor 10 and are spaced longitudinally thereof, and the spacing disks 13 also rotatably mounted upon the arbor 10 between the clamping members 11 and 12. These spacing disks are adapted to laterally space the blanks from each other. The clamping members and also the spacing disks terminate radially inwardly of the peripheral roughed out tooth portions of the blanks so that when the same are engaged by the tooth-forming die they may be laterally upset to provide tooth bearing surfaces of greater width than the body portions of the blanks. The clamping members are secured from displacement relative to the arbor by suitable means such as the nut 14 threadedly engaging the outer end of the arbor.

For the purpose of positioning the blanks in each clamping device so that their roughed out teeth are aligned, I have provided the projections 15, which are in the nature of pins and extend transversely from the inner clamping member 11 on diametrically opposite sides of the arbor 10. These projections extend through the blanks and spacing disks into the outer clamping member and in addition to properly positioning the blanks, assure rotation of the elements forming the clamping device as a unit.

From the above description it will be readily seen that I have provided a simple construction of apparatus for rolling teeth upon blanks having roughed out teeth in which the teeth of the blanks and tooth-forming die will come into mesh during their relative advancement toward each other. It will also be readily seen that I have provided a suitable clamping device for securing a plurality of blanks so that their roughed out teeth may be simultaneously rolled and laterally upset. It will be further seen that with my apparatus substantially equal and opposite forces are placed upon the tooth forming die thereby avoiding liability of movement of this die away from the blank with which it is in rolling engagement.

What I claim as my invention is:

1. In an apparatus for rolling teeth upon a blank, the combination with means for rotatably carrying a blank, of a rotatable tooth-forming die movable relatively toward and into engagement with the periphery of the blank, and means engageable with the periphery of said die at the same time said die engages the blank for exerting a force upon said die in a direction opposite and substantially equal to that exerted by the blank.

2. In an apparatus for rolling teeth upon a blank, the combination with a support for rotatably carrying peripherally spaced blanks, of a rotating tooth-forming die simultaneously engageable with the peripheries of blanks on opposite sides of its axis.

3. In an apparatus for rolling teeth upon blanks, the combination with a support, an arbor projecting from said support and having a free outer end, cooperating clamping members upon said arbor and spaced longitudinally thereof, spacers upon said arbor between said clamping members, said spacers being arranged to laterally space the blanks from each other and means engaging the free outer end of said arbor for forcing said clamping members together.

4. In an apparatus for rolling teeth upon blanks, the combination of a support, an arbor extending transversely of said support, cooperating clamping members rotatably mounted upon said arbor, and spacing disks between said clamping members for laterally spacing the blanks from each other, said disks terminating radially inwardly of the peripheries of the blanks.

5. In an apparatus for rolling teeth upon blanks, the combination of a support, an arbor upon said support, cooperating clamping members rotatably mounted upon said arbor and spaced longitudinally thereof, spacers rotatably mounted upon said arbor between said clamping members for laterally spacing the blanks from each other, said spacers terminating radially inwardly of the peripheries of the blanks and means upon one of said clamping members and extending through the blanks for positioning the same.

6. The method of rolling teeth upon a blank which includes moving a blank having roughed out teeth and a tooth-forming die relatively toward and into engagement with each other, rolling the die upon the roughed out teeth of the blank, and imposing a force upon the periphery of one of the members acting in a direction opposite and substantially equal to that exerted by the other member.

7. The method of rolling teeth upon a blank including moving a tooth-forming die and a blank having roughed out teeth relatively toward and into engagement with each other, rotating the die prior to and during its engagment with the blank whereby the roughed out teeth are properly meshed with the teeth of the die and rolled, and imposing a force upon the periphery of one of the members acting in a direction opposite and substantialy equal to that exerted by the other member.

8. In an apparatus for rolling teeth upon blanks, the combination with a support, an arbor upon said support, cooperating clamping members upon said arbor and spaced longitudinally thereof, one of said members being provided with spaced apertures, spacers upon said arbor between said clamping members for laterally spacing the blanks from each other, said spacers and blanks being provided with spaced apertures corresponding to the apertures in the aforesaid clamping member and spaced pins projecting from the other of said clamping members and adapted to extend through the aforesaid apertures for positioning the said blanks.

9. The method of rolling teeth upon a pair of spaced blanks having roughed out teeth which includes moving a tooth forming die between the peripheral edges of said blanks and into engagement therewith, rolling the die upon the roughed out teeth of the blank whereby substantially equal and opposite forces are placed upon the tooth forming die for preventing movement of the same away from the blanks.

In testimony whereof I affix my signature.

MILES G. HANSON.